United States Patent
Maeda et al.

(10) Patent No.: US 11,248,555 B2
(45) Date of Patent: Feb. 15, 2022

(54) CONTROL METHOD AND CONTROL DEVICE FOR INTERNAL COMBUSTION ENGINE

(71) Applicant: NISSAN MOTOR CO., LTD., Yokohama (JP)

(72) Inventors: Hirofumi Maeda, Kanagawa (JP); Masaharu Kassai, Kanagawa (JP)

(73) Assignee: NISSAN MOTOR CO., LTD., Yokohama (JP)

(*) Notice: Subject to any disclaimer, the term of this patent is extended or adjusted under 35 U.S.C. 154(b) by 280 days.

(21) Appl. No.: 16/615,228

(22) PCT Filed: May 24, 2017

(86) PCT No.: PCT/JP2017/019429
§ 371 (c)(1),
(2) Date: Nov. 20, 2019

(87) PCT Pub. No.: WO2018/216154
PCT Pub. Date: Nov. 29, 2018

(65) Prior Publication Data
US 2020/0200116 A1    Jun. 25, 2020

(51) Int. Cl.
*F02D 41/40* (2006.01)
*F02P 5/04* (2006.01)
*F02D 41/38* (2006.01)

(52) U.S. Cl.
CPC .............. *F02D 41/402* (2013.01); *F02P 5/04* (2013.01); *F02P 5/045* (2013.01); *F02D 2041/389* (2013.01)

(58) Field of Classification Search
CPC .... F02P 5/04; F02P 5/045; F02P 5/145; F02P 9/002; F02D 37/02; F02D 41/402; F02D 41/3029; F02D 2041/389; Y02T 10/40
See application file for complete search history.

(56) References Cited

U.S. PATENT DOCUMENTS 5,996,547 A * 12/1999 Machida ............. F02D 41/1475
123/295
6,336,436 B1   1/2002 Miyakubo et al.
(Continued)

FOREIGN PATENT DOCUMENTS

DE    10031874 A1    1/2002
DE    10046693 A1    4/2002
(Continued)

*Primary Examiner* — Phutthiwat Wongwian
*Assistant Examiner* — Arnold Castro
(74) *Attorney, Agent, or Firm* — Foley & Lardner LLP

(57) ABSTRACT

As a control method for internal combustion engine, a part of a low-medium revolution speed/low-medium load region of an internal combustion engine is set as a lean combustion region, homogeneous combustion is performed in an operating region within the lean combustion region where a load is relatively low, by injecting fuel at least once between an intake stroke and the first half of a compression stroke to form a homogeneous air-fuel mixture in a combustion chamber, and stratified combustion is performed in an operating region within the lean combustion region where the load is relatively high, by injecting the fuel at least once, respectively, between the intake stroke and the first half of the compression stroke as well as in the second half of the compression stroke to form a stratified air-fuel mixture in the combustion chamber. In this control method, ignition energy supplied to an ignition plug when the stratified combustion is performed is controlled to be smaller than ignition energy supplied to the ignition plug when the homogeneous combustion is performed.

5 Claims, 17 Drawing Sheets

(56) References Cited

U.S. PATENT DOCUMENTS

| | | | |
|---|---|---|---|
| 6,356,831 B1* | 3/2002 | Michelini | F02D 41/3029 |
| | | | 701/56 |
| 6,408,816 B1* | 6/2002 | Tomita | F02D 41/402 |
| | | | 123/295 |
| 6,732,706 B2* | 5/2004 | Shiraishi | F02D 41/3029 |
| | | | 123/301 |
| 7,350,504 B2* | 4/2008 | Yasunaga | F02D 41/402 |
| | | | 123/406.47 |
| 8,210,152 B2* | 7/2012 | Pagot | F02D 41/3023 |
| | | | 123/295 |
| 2003/0154954 A1 | 8/2003 | Bogel et al. | |
| 2004/0020190 A1* | 2/2004 | Yoshida | F02D 41/1463 |
| | | | 60/286 |
| 2006/0037583 A1* | 2/2006 | Tanaka | F02P 5/1504 |
| | | | 123/406.47 |
| 2016/0032860 A1* | 2/2016 | Mano | F02D 41/04 |
| | | | 123/478 |
| 2016/0115880 A1 | 4/2016 | Kondo et al. | |
| 2017/0122281 A1 | 5/2017 | Imanaka et al. | |

FOREIGN PATENT DOCUMENTS

| | | |
|---|---|---|
| JP | 11-303721 A | 11/1999 |
| JP | 2000-283014 A | 10/2000 |
| JP | 2001-153015 A | 6/2001 |
| JP | 2004-502084 A | 1/2004 |
| JP | 2004-245171 A | 9/2004 |
| JP | 2006-46276 A | 2/2006 |
| JP | 2007-292059 A | 11/2007 |
| JP | 2010-261395 A | 11/2010 |
| JP | 2011-140889 A | 7/2011 |
| JP | 2015-187439 A | 10/2015 |
| JP | 2015-200254 A | 11/2015 |

* cited by examiner

CONTROL METHOD AND CONTROL DEVICE FOR INTERNAL COMBUSTION ENGINE

TECHNICAL FIELD

The present invention relates to a control for internal combustion engine for forming a stratified air-fuel mixture by injecting fuel at least once, respectively, between an intake stroke and the first half of a compression stroke as well as in the second half of the compression stroke, and performing spark ignition while flow energy around an ignition plug is increased by energy of a fuel spray injected in the second half of the compression stroke.

BACKGROUND ART

So-called stratified combustion in which fuel is burned in a state where a combustible air-fuel mixture formed around an ignition plug and a lean air-fuel mixture formed in other parts is known. JP 1999-303721A1 discloses a control for extending a discharge period longer than a discharge period during homogeneous combustion when the stratified combustion is performed during a low-load operation of an internal combustion engine. The control disclosed in the above literature is intended for avoiding a situation where the combustible air-fuel mixture is absent around the ignition plug during the discharge period.

SUMMARY OF INVENTION

In the case of the stratified combustion, an equivalence ratio around the ignition plug is larger than in the case of the homogeneous combustion in which a homogeneous combustible air-fuel mixture is formed in the entirety of a combustion chamber and burned. That is, during the stratified combustion, the air-fuel mixture around the ignition plug is more liable to ignition than during the homogeneous combustion. Thus, a waveform of a discharge current for obtaining stable combustion during the stratified combustion is different from that of a discharge current during the homogenous combustion.

However, although the above literature mentions an ignition timing and the discharge period, the waveform of the discharge current suitable for the stratified combustion is not mentioned. Thus, the control of the above literature has room for improvement.

Accordingly, the present invention aims to provide a control method for making a waveform of a discharge current suitable for stratified combustion during the stratified combustion.

According to one embodiment of this invention, a control method for internal combustion engine, comprising setting a part of a low-medium revolution speed/low-medium load region of an internal combustion engine as a lean combustion region; performing homogeneous combustion in an operating region within the lean combustion region where a load is relatively low, by injecting fuel at least once between an intake stroke and the first half of a compression stroke to form a homogeneous air-fuel mixture in a combustion chamber; and performing stratified combustion in an operating region within the lean combustion region where the load is relatively high, by injecting the fuel at least once, respectively, between the intake stroke and the first half of the compression stroke as well as in the second half of the compression stroke to form a stratified air-fuel mixture in the combustion chamber is provided. In the control method for internal combustion engine, ignition energy supplied to an ignition plug when the stratified combustion is performed is controlled to be smaller than ignition energy supplied to the ignition plug when the homogeneous combustion is performed.

DESCRIPTION OF EMBODIMENT

Hereinafter, an embodiment of the present invention is described with reference to the accompanying drawings.

Figure 1:
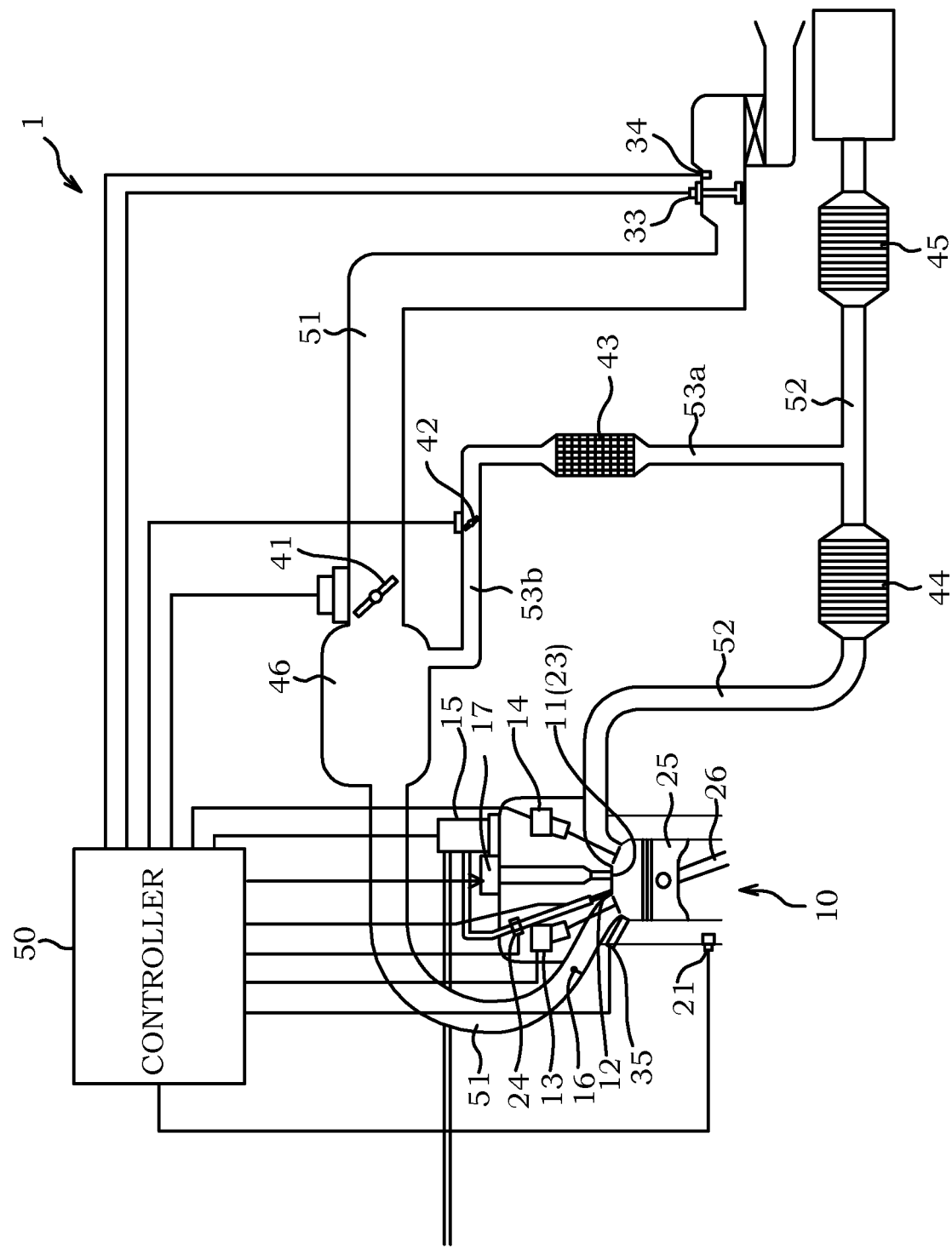
FIG. 1 is an explanatory diagram of an overall configuration of an internal combustion engine system.

FIG. 1 is an explanatory diagram of an overall configuration of an internal combustion engine system. In the internal combustion engine system 1, an internal combustion engine 10 is connected to an intake passage 51. Further, the internal combustion engine 10 is connected to an exhaust passage 52.

A tumble control valve 16 is provided in the intake passage 51. The tumble control valve 16 generates a tumble flow in a cylinder by closing a part of a flow passage cross-section of the intake passage 51.

A collector tank 46 is provided in the intake passage 51. An EGR passage 53b is also connected to the collector tank 46.

An air flow meter 33 is provided in the intake passage 51. A controller 50 connected to the air flow meter 33 obtains an intake air amount in the intake passage 51 from the air flow meter 33. Further, an intake air temperature sensor 34 is provided in the intake passage 51. The controller 50 connected to the intake air temperature sensor 34 obtains a temperature of air passing in the intake passage 51 from the intake air temperature sensor 34.

Further, an electronically controlled throttle 41 is provided in the intake passage 51 and a throttle opening is controlled by the controller 50.

Exhaust gas purifying catalysts 44, 45 for purifying exhaust gas are provided in the exhaust passage 52. Three-way catalysts or the like are used as the exhaust gas purifying catalysts 44, 45. Further, the exhaust passage 52 is branched at an intermediate position thereof into an EGR passage 53 connected to the collector tank 46.

An EGR cooler 43 is provided in the EGR passage 53. Further, an EGR valve 42 is provided in the EGR passage 53. The EGR valve 42 is connected to the controller 50. According to operating conditions of the internal combustion engine 10, the opening of the EGR valve 42 is controlled by the controller 50.

The internal combustion engine 10 includes an ignition plug 11, a fuel injection valve 12, an intake-side valve timing control mechanism 13, an exhaust-side valve timing control mechanism 14 and a fuel injection pump 15. The fuel injection valve 12 is a direct injection valve and provided near the ignition plug 11.

The ignition plug 11 is driven by a driving device 17 to perform spark ignition in a combustion chamber of the internal combustion engine 10. The ignition plug 11 is connected to the controller 50, and the controller 50, serving as a control unit, controls a spark ignition timing. It should be noted that the "ignition timing" mentioned in the present embodiment means a timing at which spark ignition is started. Further, the ignition plug 11 also operates as a flow velocity sensor 23 for detecting a gas flow velocity in the discharge gap.

The driving device 17 causes the ignition plug 11 to generate a discharge voltage in accordance with an ignition signal from the controller 50. Further, the driving device 17 includes, in addition to a circuit for spark discharge upon start of discharge, a circuit for applying a voltage (hereinafter, also referred to as a superimposed voltage) in the same direction as the discharge voltage between electrodes of the ignition plug 11 during a discharge period. Since a configuration for applying the superimposed voltage is known (e.g. JP 2016-53312A1), detailed description is omitted.

By applying the superimposed voltage during the discharge period, a discharge time can be extended. In other words, the discharge period can be controlled at will by controlling the superimposed voltage.

The fuel injection valve 12 directly injects fuel into the combustion chamber of the internal combustion engine 10. The fuel injection valve 12 is connected to the controller 50 and the controller 50 serving as the control unit controls a fuel injection timing. In the present embodiment, so-called multi-stage injection of injecting the fuel a plurality of times including an intake stroke is performed. The fuel injection pump 15 supplies the pressurized fuel to a fuel supply pipe connected to this fuel injection valve 12.

The intake-side valve timing control mechanism 13 changes opening and closing timings of an intake valve. The exhaust-side valve timing control mechanism 14 changes opening and closing timings of an exhaust valve. The intake-side valve timing control mechanism 13 and the exhaust-side valve timing control mechanism 14 are connected to the controller 50. Opening and closing timings of these mechanisms are controlled by the controller 50. It should be noted that, although both the intake-side valve timing control mechanism 13 and the exhaust-side valve timing control mechanism 14 are shown here, only one of these may be provided.

Unillustrated crank angle sensor, in-cylinder pressure sensor and accelerator position (accelerator opening degree) sensor are provided in the internal combustion engine 10. The crank angle sensor detects a crank angle in the internal combustion engine 10. The crank angle sensor is connected to the controller 50 and sends the crank angle of the internal combustion engine 10 to the controller 50.

The in-cylinder pressure sensor detects a combustion chamber pressure in the internal combustion engine 10. The in-cylinder pressure sensor is connected to the controller 50. The combustion chamber pressure in the internal combustion engine 10 is sent to the controller 50.

The accelerator position sensor detects an accelerator pedal depression amount by a driver.

Further, the internal combustion engine 10 may include a knock sensor 21 and a fuel pressure sensor 24. The controller 50 reads outputs from various sensors described above as well as unillustrated other sensors, and, based on these, controls the ignition timing, valve timings, an air-fuel ratio and the like. It should be noted that the internal combustion engine 10 includes a variable compression ratio control mechanism for changing a mechanical compression ratio and the controller 50 controls this variable compression ratio control mechanism as well. The details of the variable compression ratio control mechanism are described later.

Figure 2:
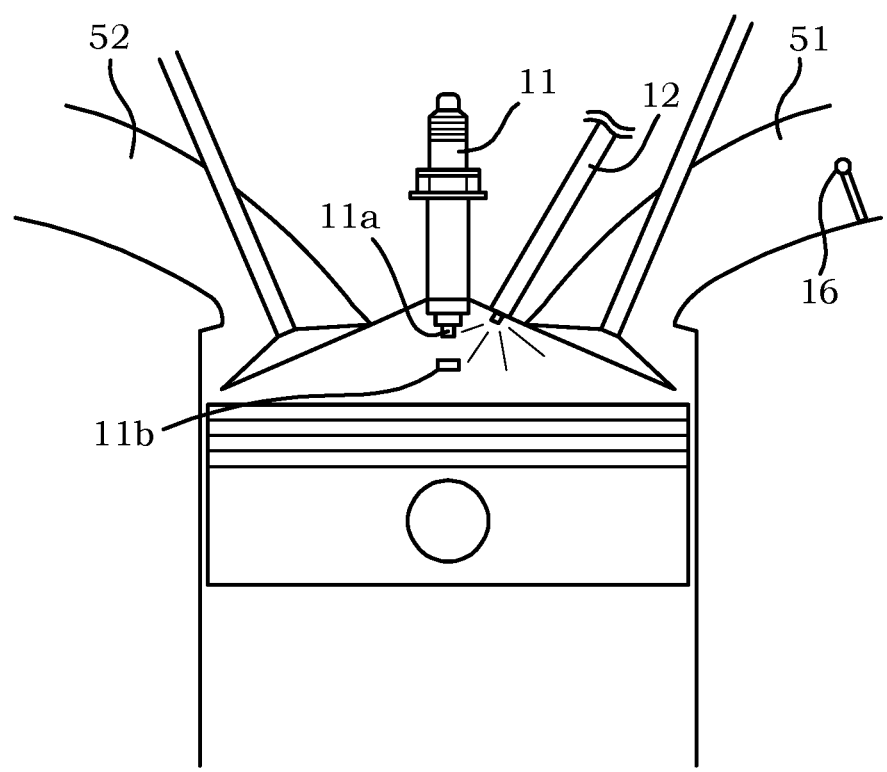
FIG. 2 is an explanatory diagram showing how a flow is provided near a plug.

FIG. 2 is a diagram showing a positional relationship between the ignition plug 11 and the fuel injection valve 12. As described above, the fuel injection valve 12 is a direct injection valve and is provided near the ignition plug 11. Thus, part of the injected fuel passes near a discharge gap, whereby a flow can be provided near the ignition plug. It should be noted that how the flow is provided is described later.

Figure 3:
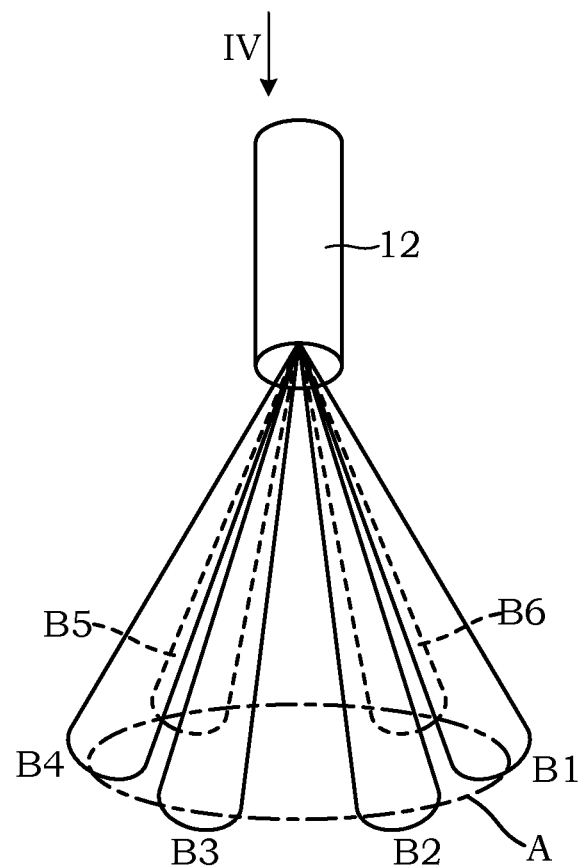
FIG. 3 is a diagram showing an injection mode of a fuel injection valve.
Figure 4:
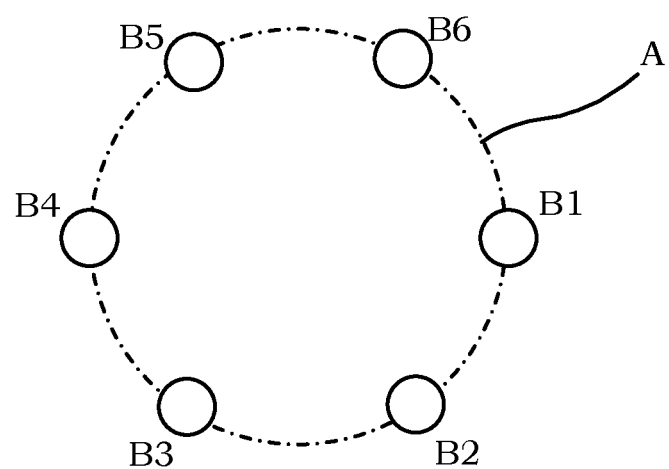
FIG. 4 is a diagram showing spray beams.

FIG. 3 shows a mode of fuel sprays injected from the fuel injection valve 12. FIG. 4 is a view of a plane including a circle A in FIG. 3 viewed in the direction of arrow IV in FIG. 3.

The fuel injection valve 12 of the present embodiment injects the fuel from six injection holes. Provided that B1 to B6 denote fuel sprays (hereinafter, also referred to as spray beams) injected from the six injection holes, each spray beam has such a conical shape that the spray cross-section becomes larger as the distance from the injection hole increases. Further, cross-sections of the spray beams B1 to B6, cut by the plane including the circle A, are arranged at equal intervals in an annular manner as shown in FIG. 4.

Figure 5:
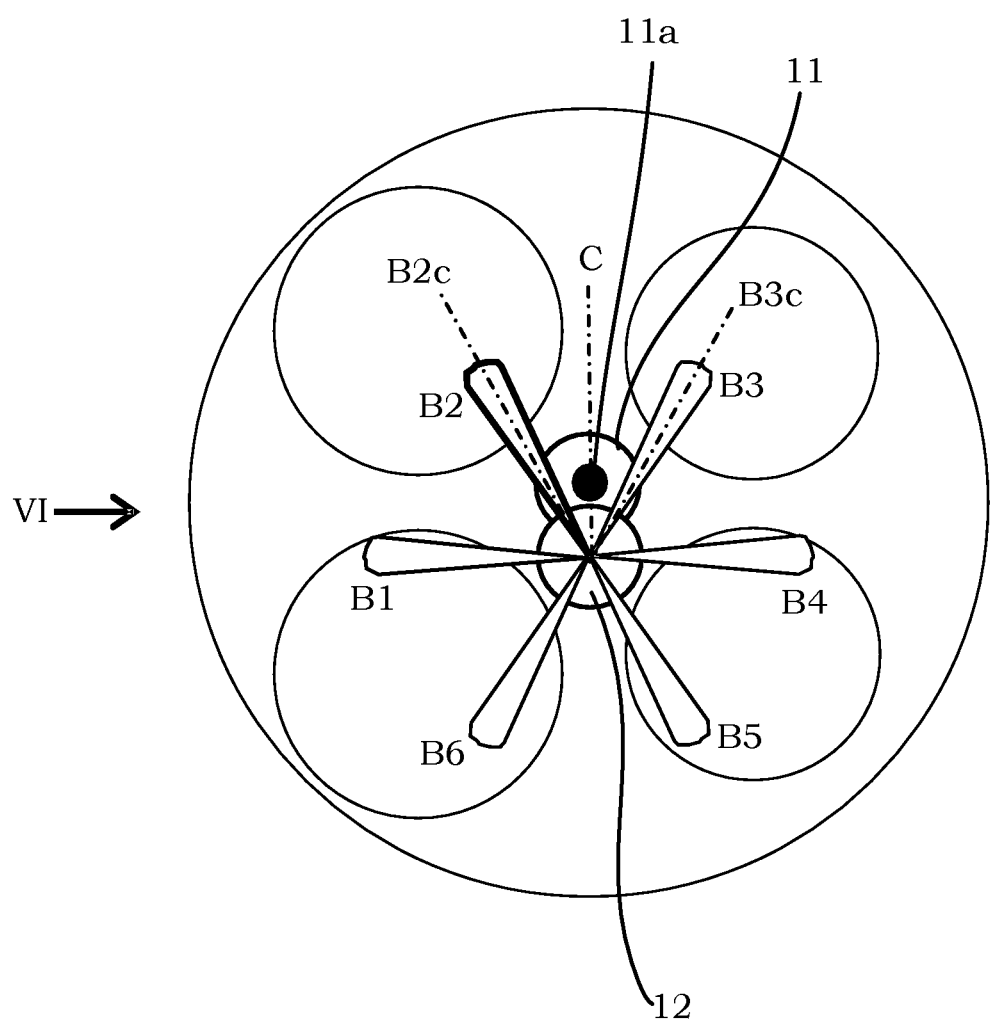
FIG. 5 is a diagram showing the arrangement of an ignition plug and the fuel injection valve.

FIG. 5 is a diagram showing a positional relationship between the spray beams B1 to B6 and the ignition plug 11. The fuel injection valve 12 is arranged on a dashed-dotted line C, which is a bisector of an angle formed between a center axis B2c of the spray beam B2 and a center axis B3c of the spray beam B3.

Figure 6:
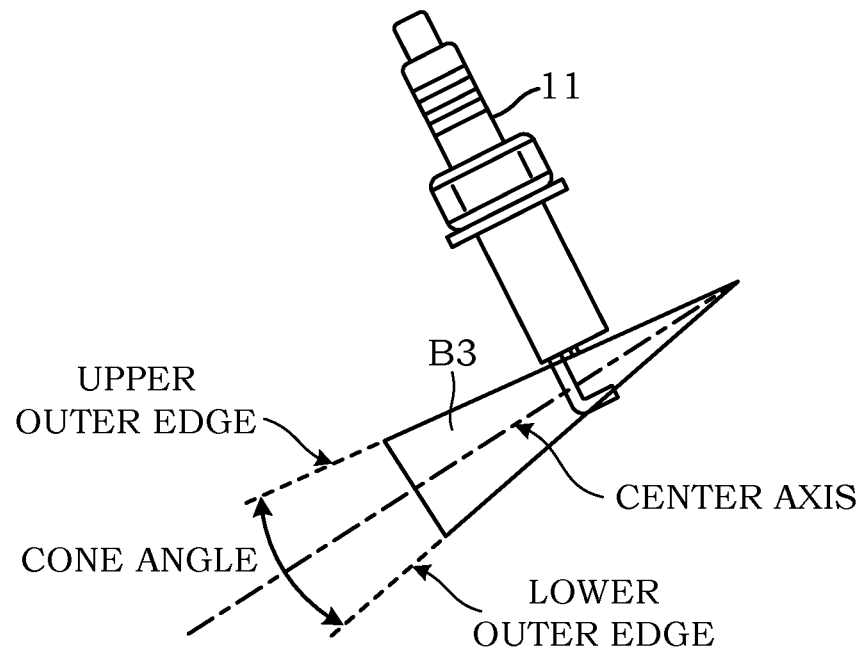
FIG. 6 is a diagram showing a relationship between a discharge region and a spray beam.

FIG. 6 is a diagram showing a positional relationship between the ignition plug 11 and the spray beam B3 when FIG. 5 is viewed in the direction of arrow VI. In FIG. 6, a discharge region sandwiched by a center electrode 11a and an outer electrode 11b is arranged within a range sandwiched by upper and lower outer edges of the spray beam B3 in FIG. 6. It should be noted that, although not shown, when FIG. 5 is viewed in the direction opposite to the direction of the arrow VI, a positional relationship between the ignition plug 11 and the spray beam B2 is symmetrical with that in FIG. 6, and the discharge region is arranged within a range sandwiched by upper and lower outer edges of the spray beam B2. Specifically, the ignition plug 11 is arranged so that the discharge region is arranged within a range sandwiched by a plane including the upper outer edge of the spray beam B2 and that of the spray beam B3 as well as a plane including the lower outer edge of the spray beam B2 and that of the spray beam B3.

Figure 7:
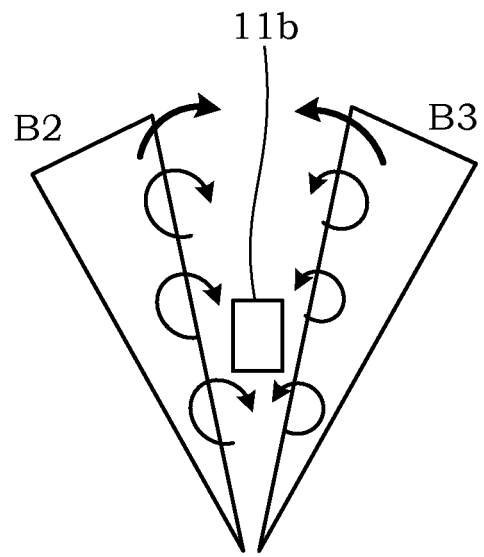
FIG. 7 is a diagram showing a contraction flow.

FIG. 7 is a diagram explaining an effect in the case where the spray beams B1 to B6 and the ignition plug 11 are in the positional relationship shown in FIGS. 5 and 6.

The fuel injected from the fuel injection valve 12 is broken up into droplets to become sprays and moves forward while taking in the surrounding air as indicated by bold arrows in FIG. 7. In this way, turbulence of air flow is generated around the sprays.

Further, if an object (including fluid) is present in the surroundings, the fluid is attracted to the object and flows along the object by the so-called Coanda effect. Specifically, a so-called contraction flow in which the spray beams B2 and B3 attract each other as shown by thin line arrows in FIG. 7 is generated. This generates very strong turbulence between the spray beams B2 and B3, thereby increasing turbulence intensity around the ignition plug 11.

Here, an intensity change of the tumble flow is described.

Figure 8:
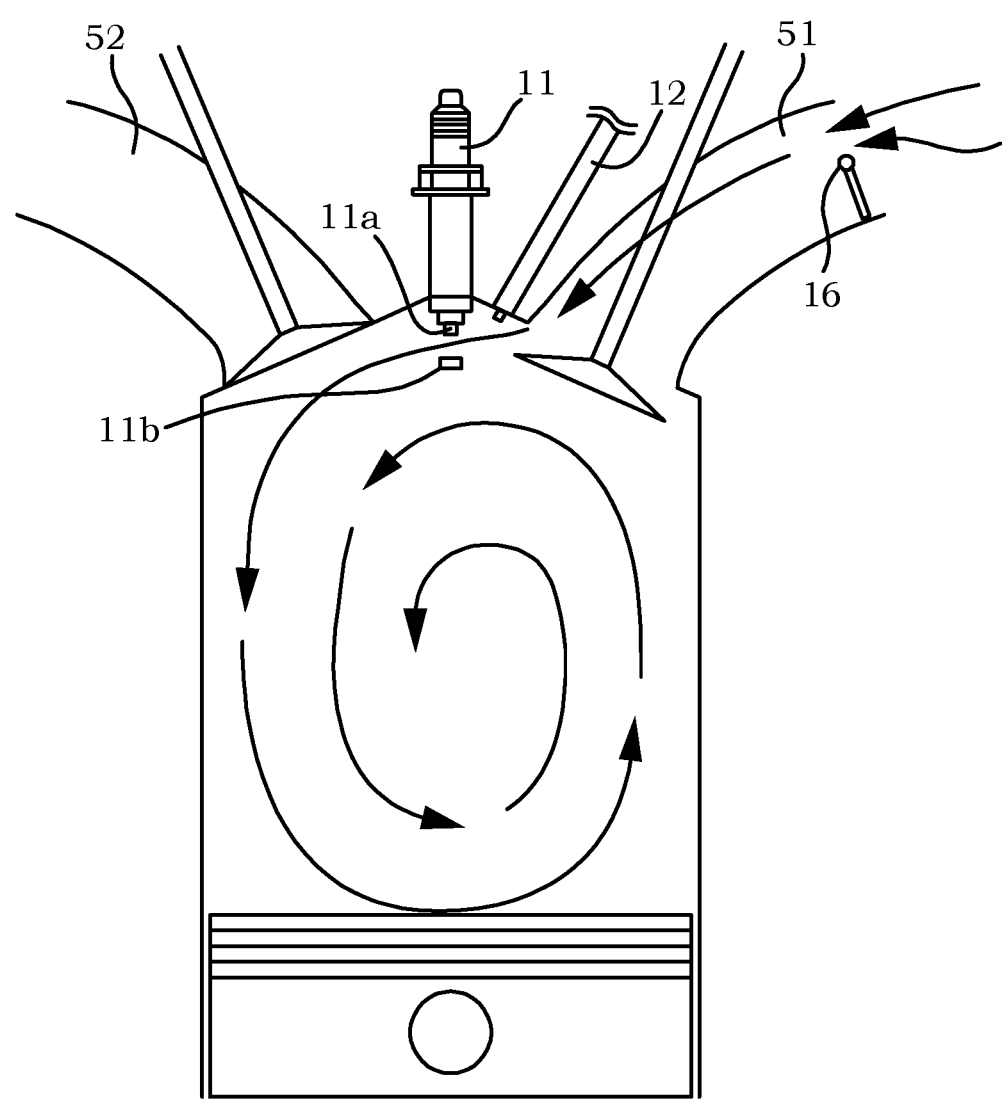
FIG. 8 is an explanatory diagram of a tumble flow generated in a cylinder.
Figure 9:
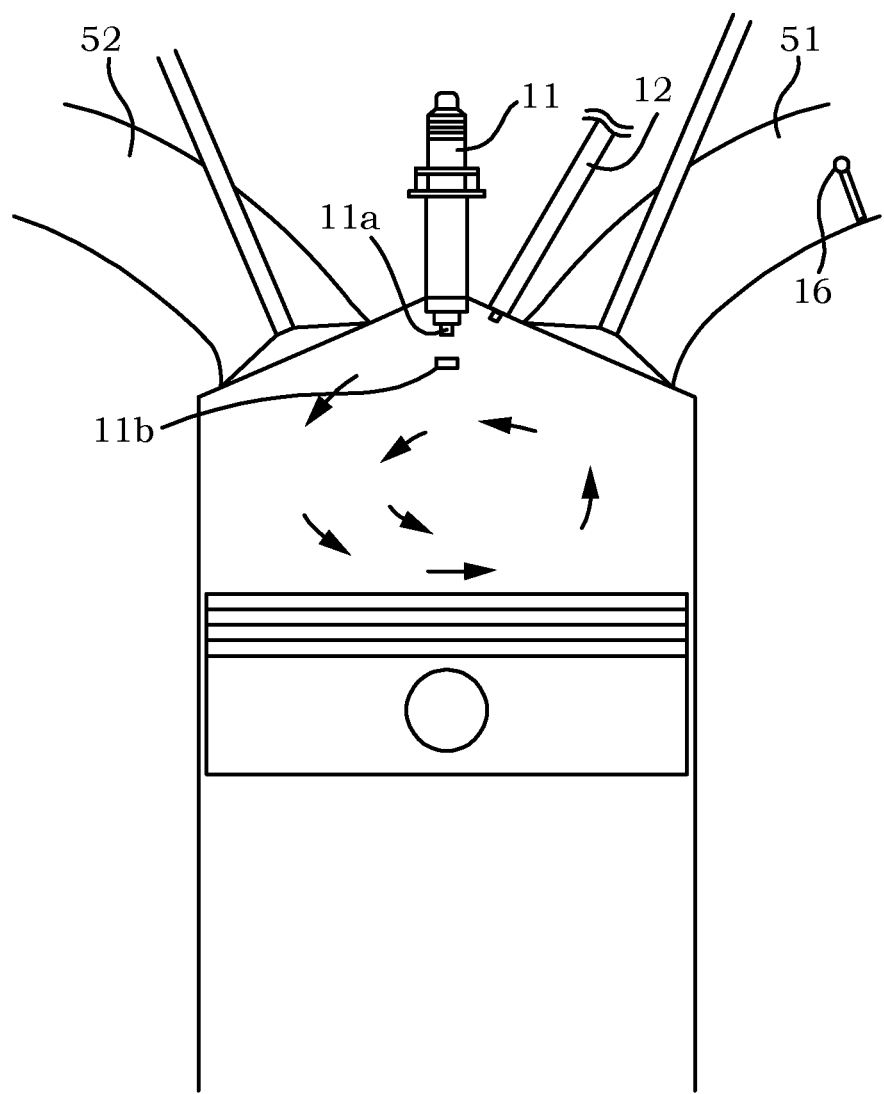
FIG. 9 is an explanatory diagram of a tumble flow during a compression stroke.

FIG. 8 is an explanatory diagram of the tumble flow generated in the cylinder. FIG. 9 is a diagram explaining the attenuation of the tumble flow. In FIGS. 8 and 9, the intake passage 51, the exhaust passage 52, the ignition plug 11, the fuel injection valve 12 and the tumble control valve 16 are shown. Further, the center electrode 11a and the outer electrode 11b of the ignition plug 11 are shown. Furthermore, a tumble flow in the cylinder in the intake stroke is shown by arrows in FIG. 8. A tumble flow in the cylinder in a compression stroke is shown in by arrows in FIG. 9.

If the tumble control valve 16 is closed in the intake stroke, intake air flows in a manner biased toward an upper side of the intake passage 51 in FIG. 8 and flows into the cylinder. As a result, the tumble flow swirling in a vertical direction is formed in the cylinder as shown. Thereafter, in the compression stroke, the combustion chamber in the cylinder becomes narrower due to an upward movement of a piston. As the combustion chamber becomes narrower, the tumble flow is squashed, gradually becomes weaker (FIG. 9) and eventually collapses.

Accordingly, when a stratified air-fuel mixture in which a combustible air-fuel mixture is present around the ignition plug 11 and a lean air-fuel mixture is present in other parts is formed and stratified combustion in which the the ignition timing is delayed until the second half of the compression stroke is performed, the flow around the ignition plug 11 is weakened at the ignition timing. Thus, an arc (hereinafter, also referred to as a plug discharge channel CN) generated between the electrodes 11a and 11b of the ignition plug 11, i.e. in the discharge gap, does not sufficiently elongate, which might cause accidental fire or partial burn. It should be noted that "around the ignition plug 11" herein includes the discharge gap of the ignition plug 11.

Accordingly, in the present embodiment, by utilizing a property in which turbulence intensity around the ignition plug 11 is increased due to injection of the fuel, a situation where the plug discharge channel CN elongates is created.

Figure 10:
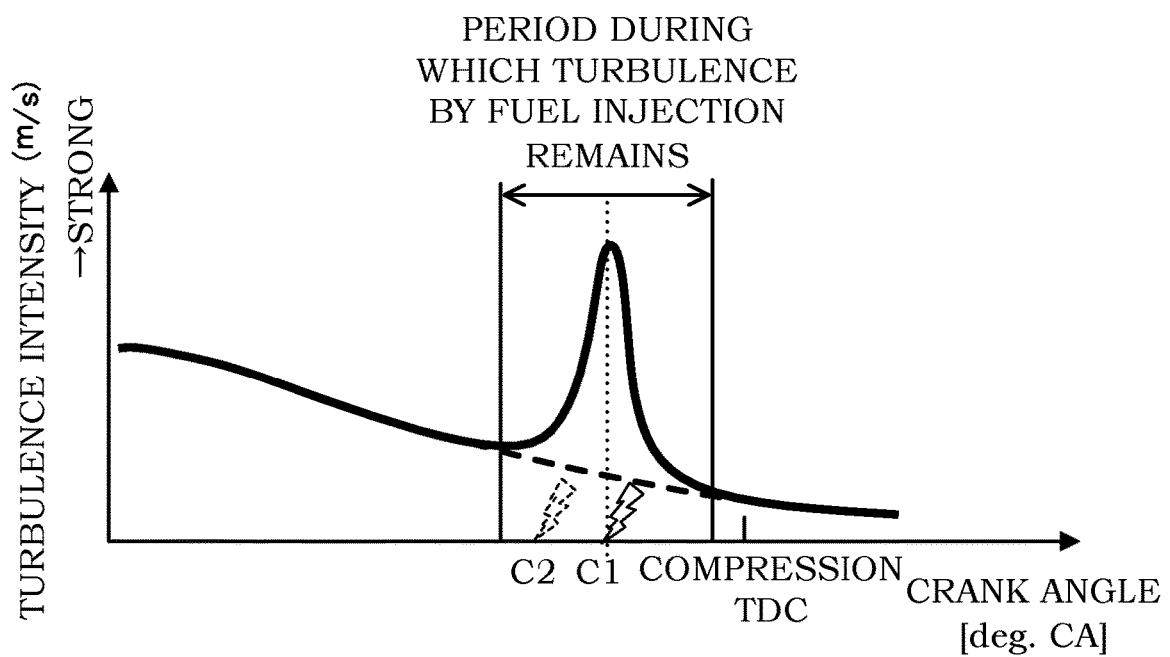
FIG. 10 is a chart showing a change of turbulence intensity around the ignition plug.

FIG. 10 is a timing chart showing a turbulence intensity change around the ignition plug 11 when the fuel was injected in the second half of the compression stroke. The horizontal axis of FIG. 10 represents the crank angle, and the vertical axis thereof represents the turbulence intensity around the ignition plug 11. A broken line in FIG. 10 represents a turbulence intensity change when the fuel is not injected in the second half of the compression stroke.

Since the intensity of the tumble flow gradually decreases as described above, the turbulence intensity around the ignition plug 11 also decreases accordingly. However, if the fuel is injected in the second half of the compression stroke, the turbulence intensity is enhanced for a predetermined period after the fuel injection. This period in which the turbulence intensity is increased by the fuel injection is the period in which the plug discharge channel CN is liable to elongation. Particularly, a timing at which the turbulence intensity peaks is suitable as the ignition timing. On the other hand, in the case of performing homogeneous lean combustion to be described later, the fuel is not injected in the second half of the compression stroke. Thus, combustion is slower than in the stratified combustion. Therefore, in the case of the homogeneous lean combustion, timing C2, which is earlier than timing C1, is suitable as the ignition timing.

Figure 11:
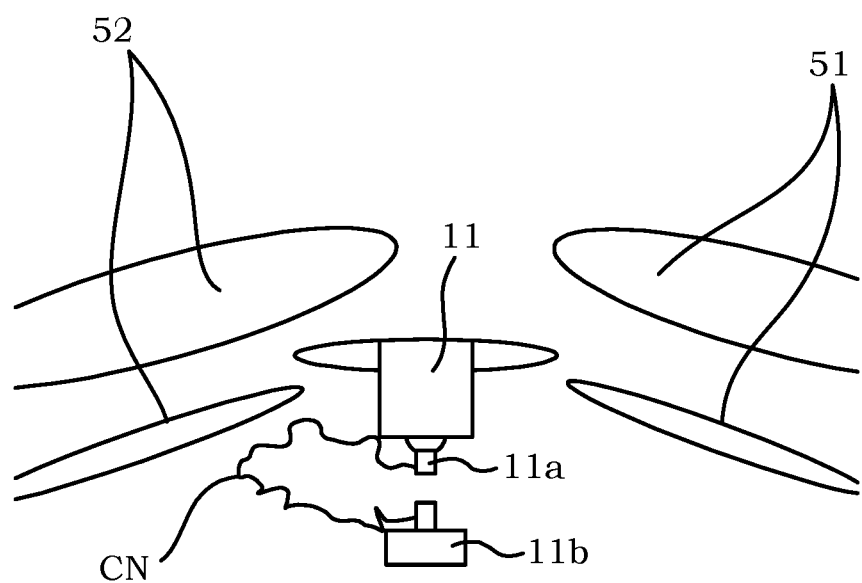
FIG. 11 is an explanatory diagram of a plug discharge channel near the ignition plug.

FIG. 11 is an explanatory diagram of the plug discharge channel CN. The center electrode 11a and the outer electrode 11b of the ignition plug 11 as well as the elongated plug discharge channel CN are shown in FIG. 11. Further, the fuel injection valve 12 is omitted here to focus on a state of the plug discharge channel CN. It should be noted that, if a flow is provided near the ignition plug so that the plug discharge channel CN is sufficiently elongated, the tip of the fuel injection valve 12 does not necessarily have to be oriented toward the ignition plug 11. For example, an embodiment may be such that the injected fuel is reflected in the combustion chamber to provide a flow around the ignition plug.

As the tumble flow becomes weaker, the flow around the ignition plug 11 becomes smaller. Thus, normally, if spark ignition is performed, the plug discharge channel CN is generated to bridge the center electrode 11a and the outer electrode 11b substantially linearly. However, in the present embodiment, spark ignition is performed in a state where the flow around the ignition plug 11 is intensified due to the fuel injection by the fuel injection valve 12. In this way, the plug discharge channel CN between the center electrode 11a and the outer electrode 11b elongates as shown in FIG. 11.

Since the flow can be provided around the ignition plug 11 and the plug discharge channel CN can be elongated after the tumble flow is weakened as just described, it is possible to suppress partial burn and accidental fire as well as improve combustion stability.

Figure 12A:
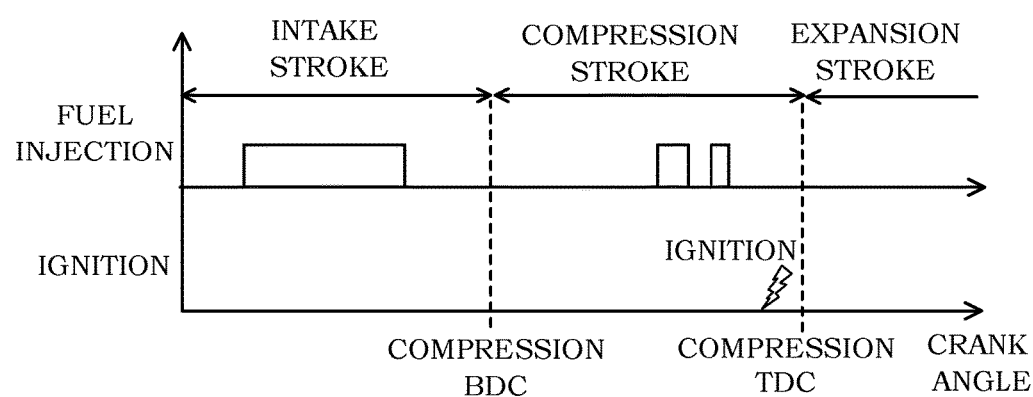
FIG. 12A is a chart showing a relationship between a fuel injection timing and an ignition timing.
Figure 12B:
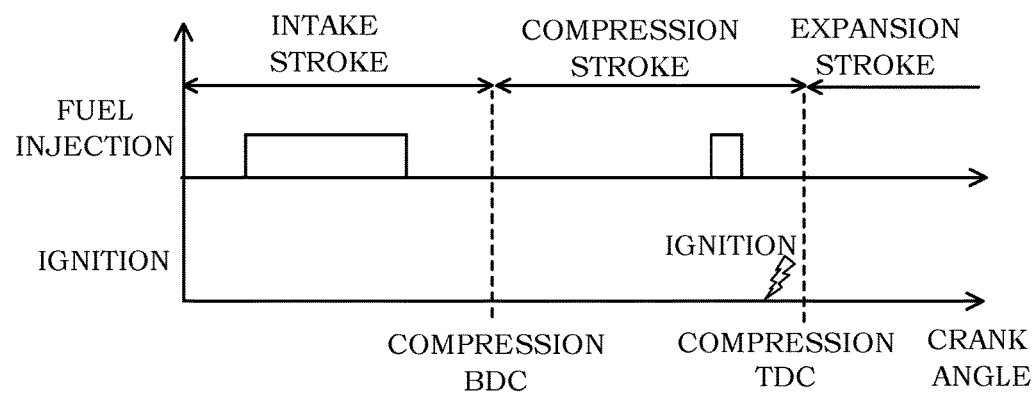
FIG. 12B is a chart showing a relationship between the fuel injection timing and the ignition timing.

FIGS. 12A and 12B are charts showing examples of a fuel injection pattern for elongating the plug discharge channel CN. 90% or more of the total injection amount is injected in the intake stroke in either cases of FIGS. 12A and 12B. The remaining fuel may be divided in two and injected twice during the second half of the compression stroke (FIG.

12A), or may be injected all at once (FIG. 12B). It should be noted that the total injection amount herein is the amount of the fuel injected per cycle.

It should be noted that, as described above, the amount of the fuel for forming the combustible air-fuel mixture around the ignition plug 11 by being injected during the second half of the compression stroke comprises 10% or less of the total injection amount of the stratified combustion of the present embodiment. Thus, the combustible air-fuel mixture formed around the ignition plug 11 takes up only but a small portion of the entirety of the combustion chamber. Such stratified combustion may be referred to as "weak stratified combustion" in order to distinguish it from the stratified combustion in which more fuel is injected in the second half of the compression stroke.

Here, a control executed by the controller 50 is described.

First, the switching of a combustion mode is described.

The controller 50 switches the combustion mode according to operating states of the internal combustion engine 10. It should be noted that the engine operating states herein are a revolution speed and a load of the internal combustion engine 10. The revolution speed can be calculated by a known method based on a detection value of the crank angle sensor. The load can be calculated by a known method based on a detection value of the accelerator position sensor.

Figure 13:
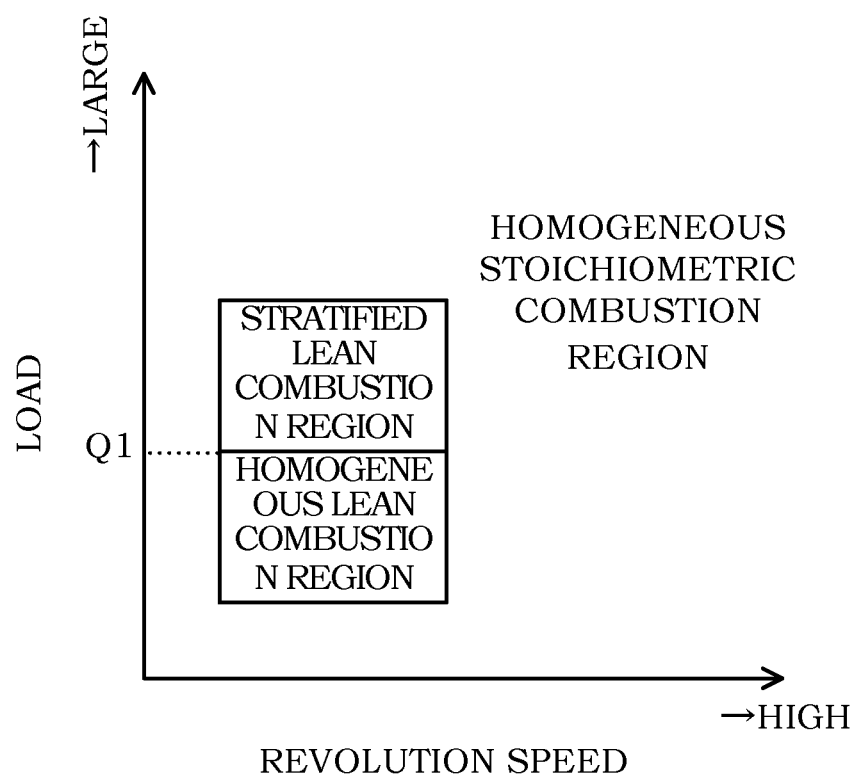
FIG. 13 is a combustion mode map.

FIG. 13 is a map showing the combustion mode executed in the respective operating states. The vertical axis of FIG. 13 represents the load, and the horizontal axis represents the revolution speed.

As shown in FIG. 13, a part of a low-medium revolution/low-medium load region serves as the lean combustion region and other regions serve as the homogeneous stoichiometric combustion region. The lean combustion region is further divided to a region having a relatively high load, serving as a stratified lean combustion region, and a region having a relatively low load, serving as a homogeneous lean combustion region, with a load Q1 serving as the boundary. The "stratified lean combustion" herein means the stratified combustion described above. The homogeneous stoichiometric combustion is combustion performed while forming an air-fuel mixture having a stoichiometric air-fuel ratio in the entirety of the combustion chamber. The load Q1 is set according to the specification of the internal combustion engine 10 to which the present embodiment is applied.

In either cases of the stratified lean combustion and the homogeneous lean combustion, the controller 50 basically controls an excess air ratio λ of the entirety of the combustion chamber to be 2. However, the excess air ratio λ is not limited to 2 in a strict sense, and the excess air ratio λ is in such a range as to be substantially 2. Further, as the load increases, the controller 50 may correct the excess air ratio λ toward a side richer than 2 to ensure ignitability and the like.

Further, in the following description, an air-fuel ratio A/F may be used instead of the excess air ratio λ. In this case, the excess air ratio λ=2 is shown to be the air-fuel ratio A/F≈30.

Further, as the load of the internal combustion engine 10 increases, the controller 50 reduces the mechanism compression ratio to suppress the occurrence of knocking. However, during the stratified lean combustion, the controller 50 controls the mechanism compression ratio to be higher than during the homogeneous lean combustion under the same operating conditions. This is because a combustion rate is higher in the stratified lean combustion and knocking is less likely to occur than in the homogeneous lean combustion.

Here, the variable compression ratio control mechanism is described. A known variable compression ratio control mechanism may be used. An example of the known variable compression ratio control mechanism is described here.

Figure 14:
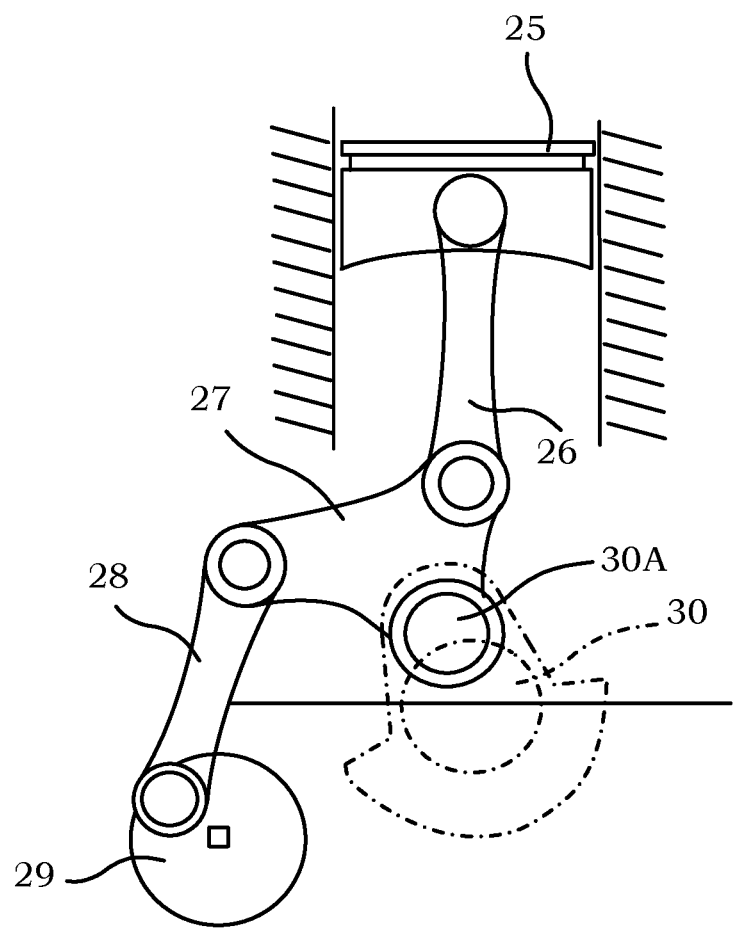
FIG. 14 is a diagram showing an example of a variable compression ratio control mechanism.

FIG. 14 shows a variable compression ratio control mechanism in which a top dead center position of a piston 25 is made variably controllable by coupling the piston 25 and a crankshaft 30 by a plurality of links.

The piston 25 is coupled to the crankshaft 30 via an upper link 26 and a lower link 27. One end of the upper link 26 is rotatably coupled to the piston 25, and the other end is rotatably coupled to the lower link 27. The lower link 27 is rotatably coupled to a crank pin 30A of the crankshaft 30 at a part which is different from the coupling part to the upper link 26. Further, one end of a control link 28 is rotatably coupled to the lower link 27. The other end of the control link 28 is coupled to a control shaft 29 at a position shifted from the center of rotation.

In the variable compression ratio control mechanism configured as described above, the mechanical compression ratio can be changed by rotating the control shaft 29 by an unillustrated actuator or the like. For example, if the control shaft 29 is rotated by a predetermined angle in the counterclockwise direction in FIG. 14, the lower link 27 rotates in the counterclockwise direction in FIG. 14 about the crank pin 30A via the control link 28. As a result, the top dead center position of the piston 25 moves upward to increase the mechanical compression ratio. Contrary to this, if the control shaft 29 is rotated by a predetermined angle in the clockwise direction in FIG. 14, the lower link 27 rotates in the clockwise direction in FIG. 14 about the crank pin 30A via the control link 28. As a result, the top dead center position of the piston 25 moves downward to reduce the mechanical compression ratio.

Next, ignition energy during the homogeneous lean combustion and during the stratified lean combustion is described.

Figure 15:
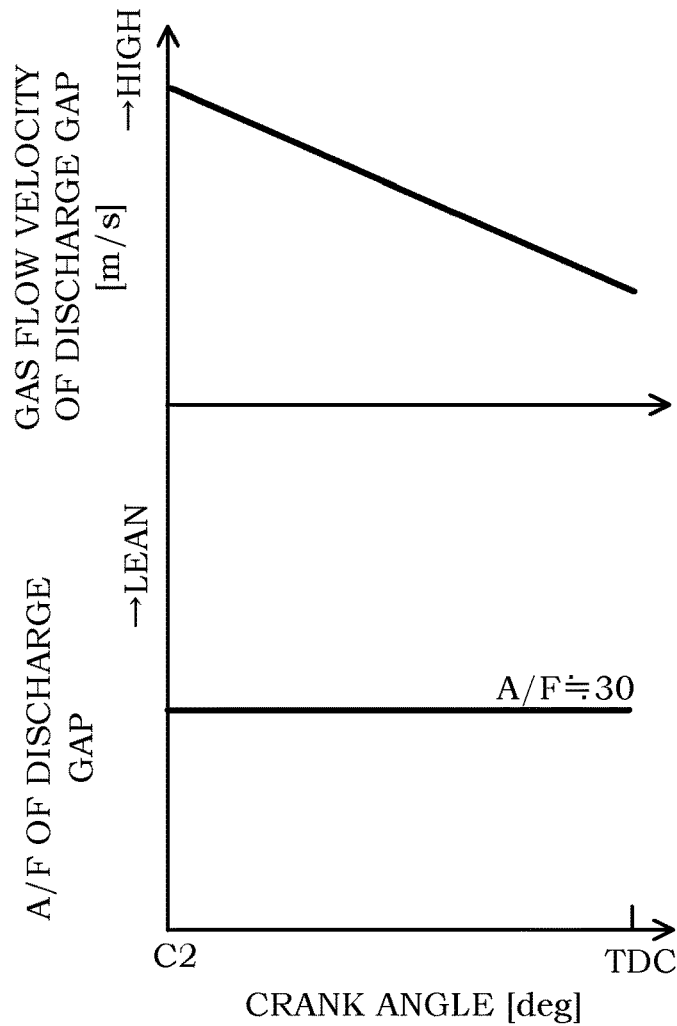
FIG. 15 is a chart of a gas flow velocity in a discharge gap and an air-fuel ratio in the discharge gap during homogeneous lean combustion.

FIG. 15 is a chart showing a gas flow velocity in the discharge gap and a change of the air-fuel ratio A/F of the discharge gap during the homogeneous lean combustion. The horizontal axis of FIG. 15 represents the crank angle [deg], and a state after timing C2 of FIG. 10 is shown.

Figure 16:
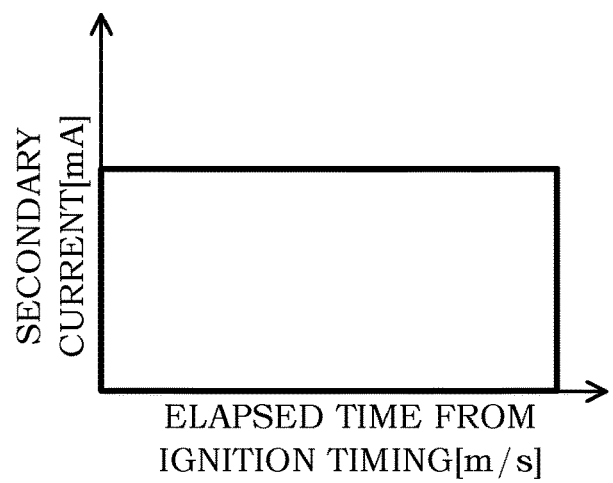
FIG. 16 is a chart showing a relationship between the time elapsed since an ignition timing and a secondary current during the homogeneous lean combustion.

FIG. 16 is a chart showing a relationship between the time elapsed since the ignition timing and a secondary current flowing into the ignition plug 11 during the homogeneous lean combustion.

Figure 17:
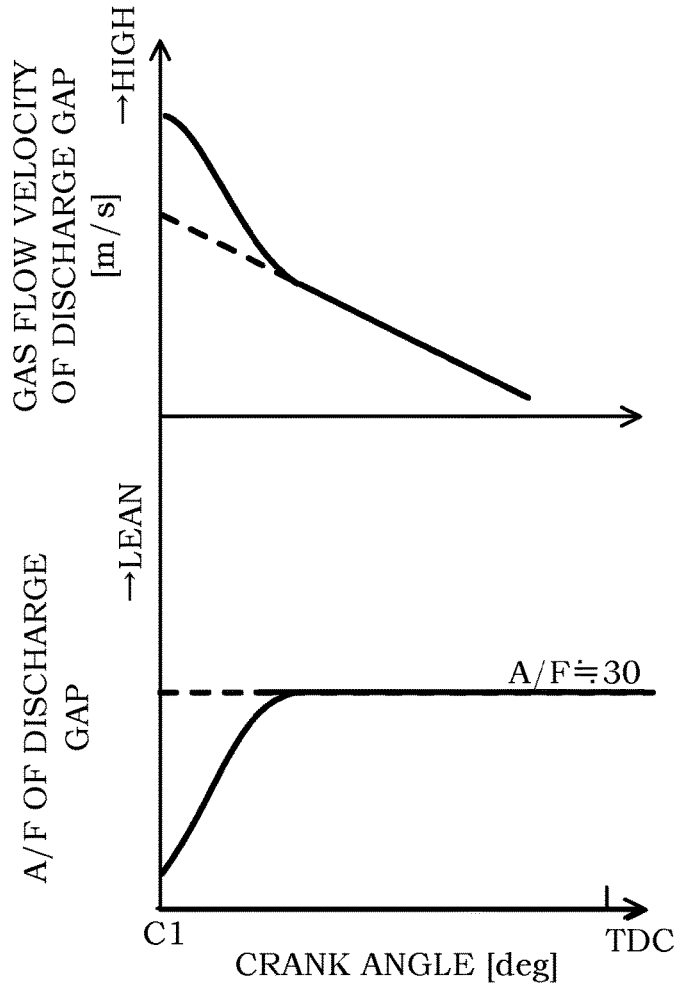
FIG. 17 is a chart of the gas flow velocity in the discharge gap and the air-fuel ratio in the discharge gap during stratified lean combustion.

FIG. 17 is a chart showing the gas flow velocity in the discharge gap and the change of the air-fuel ratio A/F of the discharge gap during the homogeneous lean combustion. The horizontal axis of FIG. 17 represents the crank angle [deg], and a state after timing C1 of FIG. 10 is shown.

Figure 18:
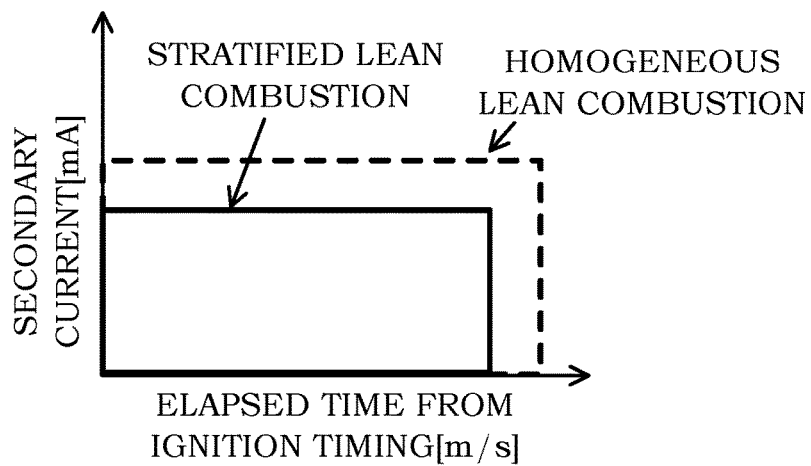
FIG. 18 is a chart showing a relationship between the time elapsed since the ignition timing and the secondary current during the stratified lean combustion.

FIG. 18 is a chart showing a relationship between the time elapsed since the ignition timing and the secondary current flowing into the ignition plug 11 during the stratified lean combustion. It should be noted that a broken line in FIG. 18 is a chart during the homogeneous lean combustion of FIG. 16.

The "gas flow velocity in the discharge gap" in FIGS. 15 and 17 is synonymous with the turbulence intensity described with reference to FIG. 10.

During the homogeneous lean combustion, the gas flow velocity in the discharge gap decreases as the crank angle advances. Further, since the excess air ratio λ of the entirety of the combustion chamber is controlled to be 2, i.e. the air-fuel ratio A/F is controlled to be substantially 30 during the homogeneous lean combustion, the air-fuel ratio A/F of the discharge gap is substantially 30 as a matter of course.

In contrast, during the stratified lean combustion, spark ignition is performed after the fuel is injected in the second half of the compression stroke. Thus, the gas flow velocity in the discharge gap at the ignition timing becomes higher than during the homogeneous lean combustion. However, since the effect of increasing the gas flow velocity by the fuel injection gradually attenuates, the gas flow velocity in the discharge gap eventually becomes equal to that during the homogeneous lean combustion.

Further, due to the fuel injection in the second half of the compression stroke, the air-fuel ratio A/F of the discharge gap at the ignition timing becomes richer than that during the homogeneous lean combustion. However, since the fuel injected in the second half of the compression stroke is diffused due to a penetration force thereof as well as the tumble flow, the air-fuel ratio A/F of the discharge gap gradually returns to 30.

During the homogeneous lean combustion, the A/F of the discharge gap is substantially 30, which is greatly leaner than the stoichiometric air-fuel ratio, such that the air-fuel mixture in the discharge gap is less liable to ignition than during the stratified lean combustion. Further, during the homogeneous lean combustion, the combustion rate is slower than during the stratified lean combustion. Thus, during the homogeneous lean combustion, a relatively large secondary current needs to flow continuously to obtain stable combustion.

On the other hand, since the air-fuel mixture in the discharge gap is more liable to ignition during the stratified lean combustion than during the homogeneous lean combustion as described above, stable combustion is obtained even with the secondary current which is lower than that during the homogeneous lean combustion. Further, since the air-fuel mixture in the discharge gap is more liable to ignition than during the homogeneous lean combustion as described above, it is also possible to set the discharge time shorter during the stratified lean combustion than that during the homogeneous lean combustion.

During the stratified lean combustion, ignition energy consumed per cycle can be made smaller than during the homogeneous lean combustion by reducing the secondary current or shortening the discharge time as described above.

As described above, a discharge waveform suitable upon the stratified lean combustion is different from that suitable upon the homogeneous lean combustion. The discharge waveform herein means a history of the secondary current shown in FIGS. 16 and 18.

Accordingly, the controller 50 controls the driving device 17 such that a constant secondary current flows during the homogeneous lean combustion, whereas a relatively large secondary current flows at the ignition timing and, thereafter, the secondary current becomes smaller during the stratified lean combustion.

It should be noted that the waveform of the secondary current shown in FIG. 18 is only an example and may be another waveform if the ignition energy is smaller than during the homogeneous lean combustion. For example, in order to further ensure the generation of an initial flame kernel, a waveform may be such that the secondary current is relatively high at the ignition timing and decreases thereafter. In a waveform in which the secondary current decreases, the secondary current may decrease in proportion to the elapsed time or may decrease in a stepwise manner at every predetermined time. As just described, the waveform of the secondary current during the stratified lean combustion can take various forms.

Figure 19:
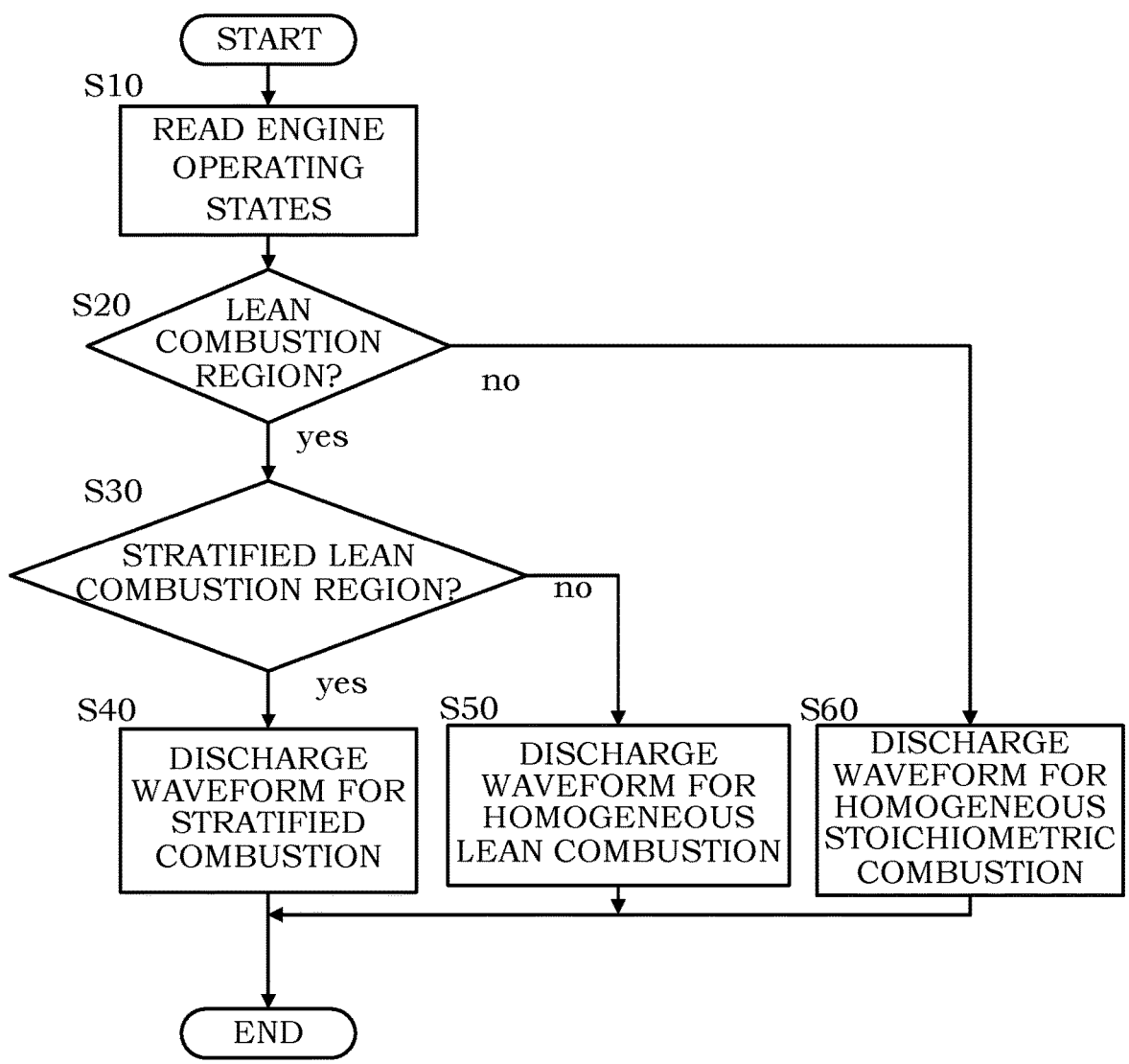
FIG. 19 is a flow chart showing a control routine stored in a controller.

FIG. 19 is a chart specifically showing the control contents described above as a control routine. This control routine is programmed in the controller 50.

In Step S10, the controller 50 reads the engine operating states. Specifically, the revolution speed and the load of the internal combustion engine 10 are read.

In Step S20, the controller 50 determines whether or not the current operating region is the lean combustion region using the engine operating states read in Step S10 and the map of FIG. 13. The controller 50 performs a processing of Step S30 if the current operating region is the lean combustion region, and performs a processing of Step S60 if the current operating region is the homogeneous stoichiometric combustion region.

In Step S30, the controller 50 determines whether or not the current operating region is the stratified lean combustion region. The controller 50 performs a processing of Step S40 if the current operating region is the stratified lean combustion region and performs a processing of Step S50 if the current operating region is the homogeneous lean combustion region.

In Step S40, the controller 50 controls the driving device 17 to attain the aforementioned discharge waveform for stratified lean combustion.

In Step S50, the controller 50 controls the driving device 17 to attain the aforementioned discharge waveform for homogeneous lean combustion.

In Step S60, the controller 50 controls the driving device 17 to attain the discharge waveform for homogeneous stoichiometric combustion. The discharge waveform for homogeneous stoichiometric combustion is basically similar to the discharge waveform for homogeneous lean combustion, but has a smaller secondary current and a shorter discharge time than the discharge waveform for homogeneous lean combustion.

Next, functions and effects achieved by executing the above control routine are described.

Figure 20:
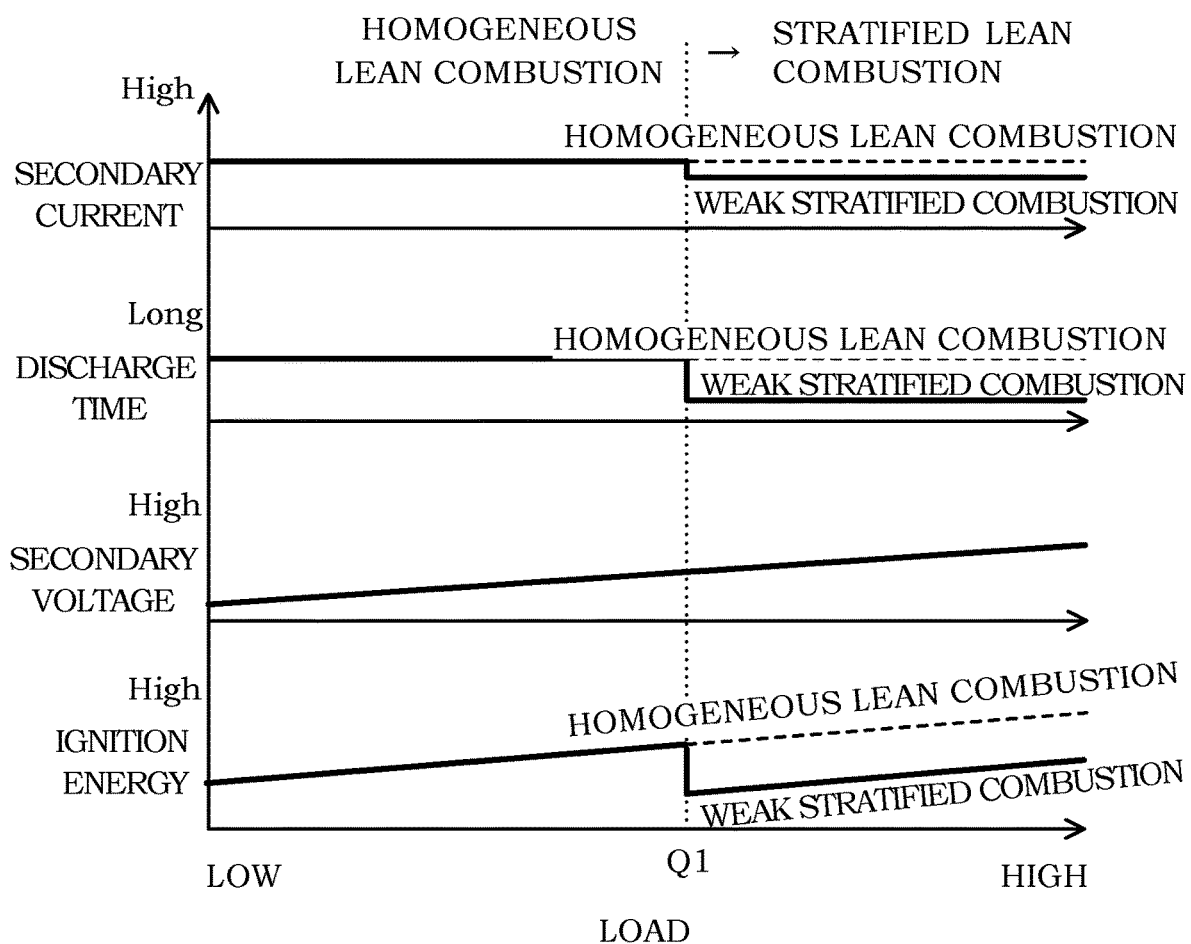
FIG. 20 is a chart showing relationships between the secondary current. a discharge time, a secondary voltage, ignition energy, and a load of an internal combustion engine in a lean combustion region.

FIG. 20 is a chart showing relationships between the secondary current, the discharge time, a secondary voltage, the ignition energy, and the load of the internal combustion engine 10 in the lean combustion region. A load Q1 in FIG. 20 is equal to the load Q1 in FIG. 13. In FIG. 20, values under the assumption that the homogeneous lean combustion is also performed in the entirety of the lean combustion region, i.e. in a relatively high load region, are shown by broken lines for comparison. It should be noted that the secondary current in FIG. 20 is a current value at the ignition timing.

The secondary current during the stratified lean combustion is lower than the secondary current when the homogeneous lean combustion is performed in this region.

The discharge time during the stratified lean combustion is shorter than the discharge time when the homogeneous lean combustion is performed in this region.

Over the entirety of the lean combustion region, the secondary voltage increases as the load increases and, accordingly, the ignition energy also increases. However, in the relatively high load region, since the stratified lean combustion is performed with the secondary current as well as the discharge time controlled as described above, the ignition energy becomes smaller than when the homogeneous lean combustion is performed in this region.

Figure 21:
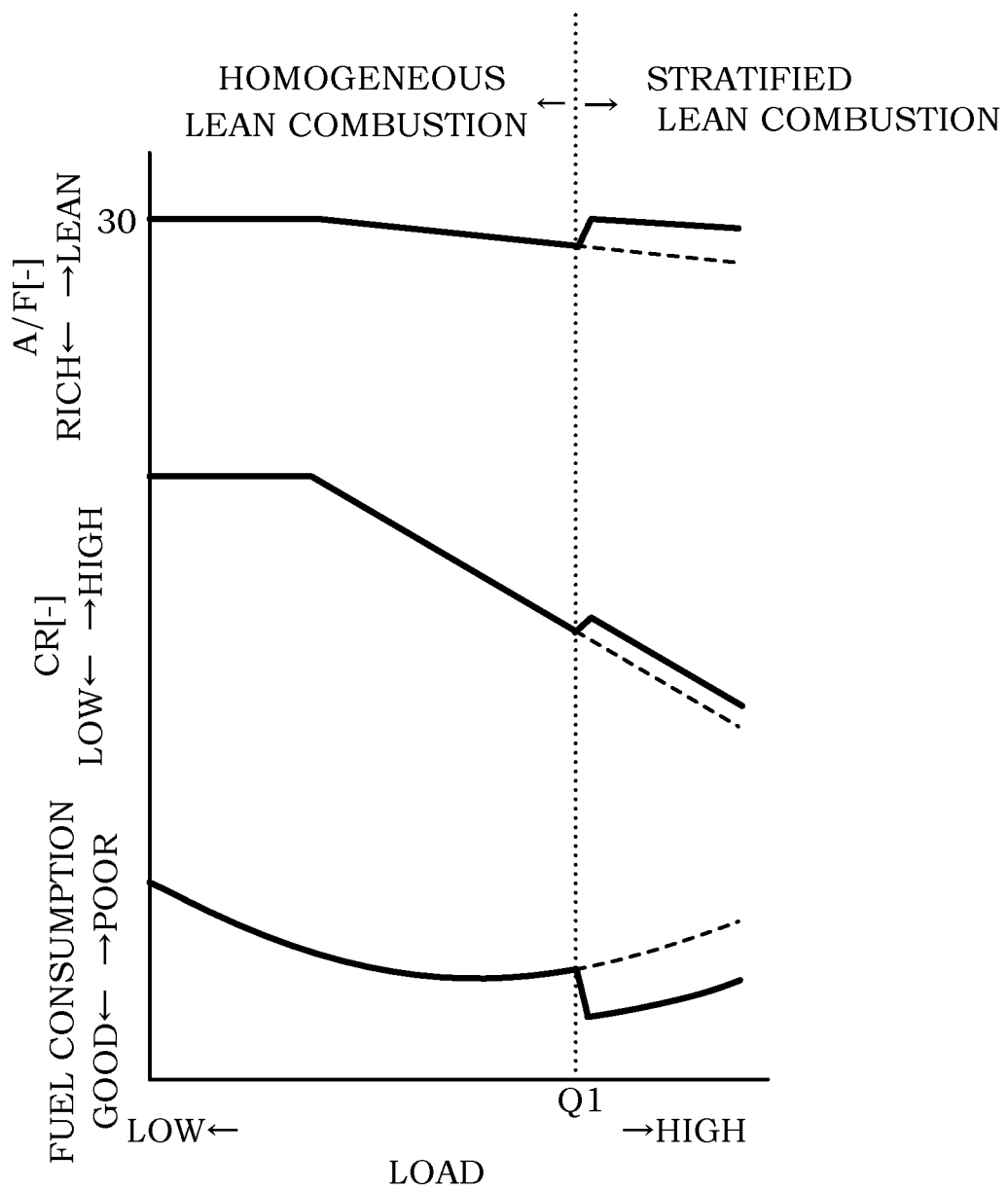
FIG. 21 is a chart showing relationships between an air-fuel ratio in the entirety of a combustion chamber, a mechanical compression ratio, fuel consumption, and the load of the internal combustion engine in the lean combustion region.

FIG. 21 is a chart showing relationships between the air-fuel ratio in the entirety of the combustion chamber, the mechanical compression ratio, fuel consumption, and the load of the internal combustion engine 10 in the lean combustion region. A load Q1 in FIG. 21 is equal to the load Q1 in FIG. 13. In FIG. 21, values under the assumption that the homogeneous lean combustion is performed also in the entirety of the lean combustion region, i.e. in the relatively high load region, are shown by broken lines for comparison.

As the load increases, in order to ensure ignitability and the like, the controller 50 enriches the air-fuel ratio such that it becomes richer than 30 in the entirety of the combustion chamber. However, in the case of the stratified lean combustion, the equivalence ratio around the ignition plug 11 increases due to the fuel injection in the second half of the compression stroke, whereby ignition becomes easier. Thus, in the case of the stratified lean combustion, the air-fuel ratio in the entirety of the combustion chamber can be made leaner than in the case of the homogeneous lean combustion in the same region.

Further, as the load increases, the controller 50 reduces the mechanical compression ratio to suppress the occurrence of knocking. However, in the case of the stratified lean combustion, the equivalence ratio around the ignition plug 11 increases due to the fuel injection in the second half of the compression stroke to accelerate flame propagation, whereby knocking becomes less likely to occur. Thus, in the case of the stratified lean combustion, the mechanical compression can be made higher than in the case of the homogeneous lean combustion in the same region.

As described above, if the stratified lean combustion is performed in the relatively high load region, the air-fuel ratio in the entirety of the combustion chamber can be made leaner and the mechanical compression ratio can be made higher as compared to the case where the homogeneous lean combustion is performed in the same region. As a result, fuel consumption in the relatively high load region becomes better as compared to the case where the homogeneous lean combustion is performed in the same region.

As described above, in the control method for the internal combustion engine 10 of the present embodiment, the controller 50 performs the homogeneous lean combustion in an operating region within the lean combustion region where the load of the internal combustion engine 10 is relatively low, by injecting the fuel at least once between the intake stroke and the first half of the compression stroke to form the homogeneous air-fuel mixture in the combustion chamber. Further, the controller 50 performs the stratified lean combustion in an operating region within the lean combustion region where the load of the internal combustion engine 10 is relatively high, by injecting the fuel at least once, respectively, between the intake stroke and the first half of the compression stroke as well as in the second half of the compression stroke to form the stratified air-fuel mixture in the combustion chamber. Then, the controller 50 controls the ignition energy supplied to the ignition plug 11 when the stratified lean combustion is performed to be smaller than the ignition energy supplied to the ignition plug 11 when the homogeneous lean combustion is performed.

In the present embodiment, the excess air ratio in the entirety of the combustion chamber is controlled to be 2 in either cases of the stratified lean combustion and the homogeneous lean combustion.

In the present embodiment, the controller 50 makes the ignition energy during the stratified lean combustion smaller than that during the homogeneous lean combustion by making the discharge time of the ignition plug 11 during the stratified lean combustion shorter than that during the homogeneous lean combustion.

In the present embodiment, the controller 50 controls the ignition energy during the stratified lean to be smaller than that during the homogeneous lean combustion by making the secondary current (discharge current) during the stratified lean combustion smaller than the secondary current (discharge current) during the homogeneous lean combustion.

Although the embodiment of the present invention has been described above, the above embodiment is merely an illustration of one exemplary application of the present invention and is not intended to limit the technical scope of the present invention to the specific configuration of the above embodiment.

The invention claimed is:

1. A control method for internal combustion engine, comprising:
setting a part of a low-medium revolution speed/low-medium load region of an internal combustion engine as a lean combustion region;
setting a high revolution speed region and high load region outside the lean combustion region of an internal combustion engine as a homogeneous stoichiometric combustion region;
performing homogeneous lean combustion in an operating region within the lean combustion region where a load is relatively low, by injecting fuel at least once between an intake stroke and the first half of a compression stroke to form a homogeneous air-fuel mixture in a combustion chamber; and
performing stratified lean combustion in an operating region within the lean combustion region where the load is relatively high, by injecting the fuel at least once, respectively, between the intake stroke and the first half of the compression stroke as well as in the second half of the compression stroke to form a stratified air-fuel mixture in the combustion chamber, wherein:
controlling ignition energy supplied to an ignition plug when the stratified lean combustion is performed to be smaller than ignition energy supplied to the ignition plug when the homogeneous lean combustion is performed.

2. The control method for internal combustion engine according to claim 1, wherein:
an excess air ratio in the entirety of the combustion chamber is controlled to be 2 in either cases of the stratified lean combustion and the homogeneous lean combustion.

3. The control method for internal combustion engine according to claim 1, wherein:
the ignition energy supplied to the ignition plug when the stratified lean combustion is performed is controlled to be smaller than the ignition energy supplied to the ignition plug when the homogeneous lean combustion is performed by making a discharge time of the ignition plug during the stratified lean combustion shorter than a discharge time of the ignition plug during the homogeneous lean combustion.

4. The control method for internal combustion engine according to claim 1, wherein:
the ignition energy supplied to the ignition plug when the stratified combustion is performed is controlled to be smaller than the ignition energy supplied to the ignition plug when the homogeneous lean combustion is performed by making a discharge current of the ignition plug during the stratified lean combustion smaller than a discharge current of the ignition plug during the homogeneous lean combustion.

5. A control device for internal combustion engine, comprising:
- a fuel injection valve configured to inject fuel directly into a combustion chamber;
- an ignition plug configured to directly spark-ignite an air-fuel mixture formed in the combustion chamber;
- a driving device configured to drive the ignition plug; and
- a control unit configured to control the fuel injection valve and the driving device, wherein:

the control unit sets a part of a low-medium revolution speed/low-medium load region of an internal combustion engine as a lean combustion region, sets a high revolution speed region and high load region outside the lean combustion region as a homogeneous stoichiometric combustion region and performs homogeneous lean combustion in an operating region within the lean combustion region where a load is relatively low, by injecting the fuel at least once between an intake stroke and the first half of a compression stroke to form a homogeneous air-fuel mixture in the combustion chamber;

performs stratified lean combustion in an operating region within the lean combustion region where the load is relatively high, by injecting the fuel at least once, respectively, between the intake stroke and the first half of the compression stroke as well as in the second half of the compression stroke to form a stratified air-fuel mixture in the combustion chamber; and controls ignition energy supplied to the ignition plug when the stratified lean combustion is performed so that the ignition energy is smaller than ignition energy supplied to the ignition plug when the homogeneous lean combustion is performed.

* * * * *